US010458580B2

(12) United States Patent
Henrich et al.

(10) Patent No.: US 10,458,580 B2
(45) Date of Patent: Oct. 29, 2019

(54) HOSE CLIP

(71) Applicant: NORMA Germany GmbH, Maintal (DE)

(72) Inventors: Detlef Henrich, Limeshain (DE); Mathias Krauß, Nidderau (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 15/949,641

(22) Filed: Apr. 10, 2018

(65) Prior Publication Data
US 2018/0292034 A1 Oct. 11, 2018

(30) Foreign Application Priority Data

Apr. 10, 2017 (DE) .................. 10 2017 107 727

(51) Int. Cl.
*F16L 33/08* (2006.01)
*F16B 2/08* (2006.01)

(52) U.S. Cl.
CPC ............. *F16L 33/08* (2013.01); *F16B 2/08* (2013.01); *Y10T 24/1427* (2015.01); *Y10T 24/1443* (2015.01)

(58) Field of Classification Search
CPC ....... F16L 33/025; F16L 33/08; F16L 33/035; F16L 33/06; F16L 33/04; Y10T 24/1427; Y10T 24/1441; Y10T 24/1443
See application file for complete search history.

(56) References Cited

U.S. PATENT DOCUMENTS

| 4,099,304 | A | 7/1978 | Luc |
| 4,300,270 | A | 11/1981 | Sauer |
| 4,667,375 | A | 5/1987 | Enlund |
| 4,887,334 | A | 12/1989 | Jansen et al. |
| 5,115,541 | A | 5/1992 | Stichel |
| 5,315,737 | A | 5/1994 | Ouimet |
| 5,560,087 | A | 10/1996 | Marques |
| 5,787,555 | A | 8/1998 | Chen |
| 5,809,619 | A | 9/1998 | Schaub |
| 5,956,817 | A | 9/1999 | Chen |
| 7,322,618 | B2 * | 1/2008 | Henrich ............... F16L 33/04 285/242 |
| 7,467,442 | B2 | 12/2008 | Chen |
| D609,997 | S | 2/2010 | Andersson |

(Continued)

FOREIGN PATENT DOCUMENTS

DE 3716327 A1 11/1988
DE 2919939 A1 11/1989
(Continued)

OTHER PUBLICATIONS

Korean Office Action for Application No. 10-2018-0041642 dated Jun. 18, 2019 (8 pages).
(Continued)

Primary Examiner — Robert Sandy
Assistant Examiner — Michael S Lee
(74) Attorney, Agent, or Firm — Reising Ethington, P.C.

(57) ABSTRACT

A hose clip includes a clip band and a clamping device. A receiving region is configured between axial edge regions of the clip band. The receiving region extends radially outwardly and in the circumferential direction. The receiving region is interrupted in the region of the clamping device.

9 Claims, 2 Drawing Sheets

(56) References Cited

U.S. PATENT DOCUMENTS

| | | |
|---|---|---|
| 8,060,991 B2 | 11/2011 | Ryhman et al. |
| 9,200,737 B2 | 12/2015 | Wyatt et al. |
| 2007/0018063 A1 | 1/2007 | Lange et al. |
| 2011/0302747 A1 | 12/2011 | Bae |
| 2013/0074290 A1* | 3/2013 | Wyatt .................... F16L 33/08 24/274 R |
| 2014/0115834 A1* | 5/2014 | Chung, II ............ F16L 33/035 24/20 R |
| 2016/0083158 A1* | 3/2016 | Wyatt .................... F16L 33/08 24/274 R |

FOREIGN PATENT DOCUMENTS

| | | |
|---|---|---|
| DE | 19743121 A1 | 2/1990 |
| DE | 4005631 A1 | 9/1991 |
| DE | 4127017 C1 | 4/1992 |
| EP | 0166756 B1 | 3/1989 |
| GB | 1523201 A | 8/1978 |
| JP | S5582890 A | 6/1980 |
| JP | S58129391 U | 9/1983 |
| JP | 2008215562 A | 9/2008 |
| KR | 101224058 B1 | 1/2013 |
| WO | 8502894 A1 | 7/1985 |
| WO | 8700602 A1 | 1/1987 |
| WO | WO9502780 A1 | 1/1995 |
| WO | 9508073 A1 | 3/1995 |

OTHER PUBLICATIONS

English Translation of Korean Office Action for Application No. 10-2018-0041642 dated Jun. 18, 2019 (6 pages).

Japanese Office Action for Application No. 2018-071367 dated Jun. 25, 2019 (7 pages).

English Translation of Japanese Office Action for Application No. 2018-071367 dated Jun. 25, 2019 (9 pages).

* cited by examiner

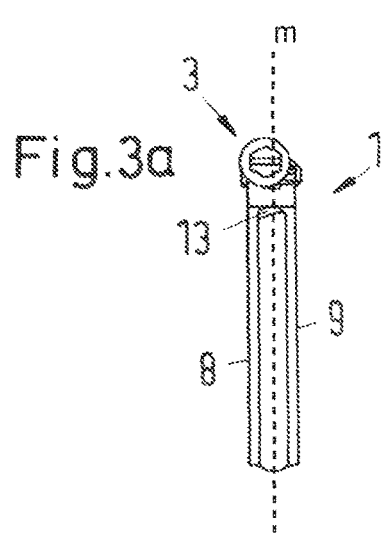
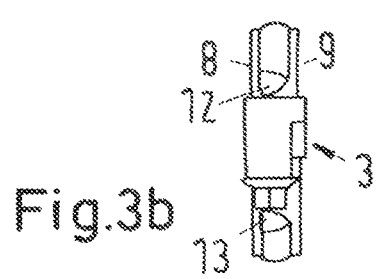
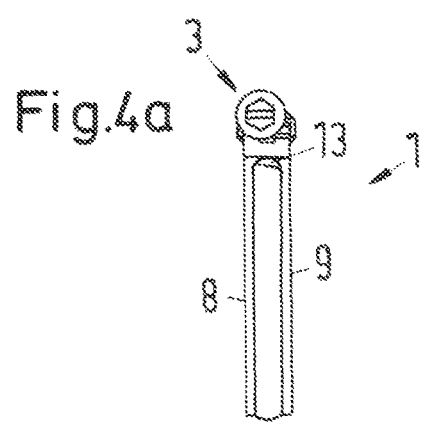
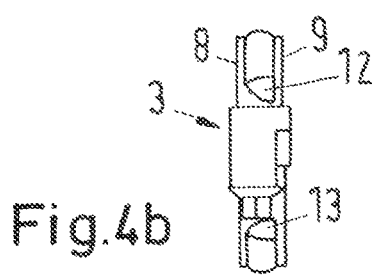
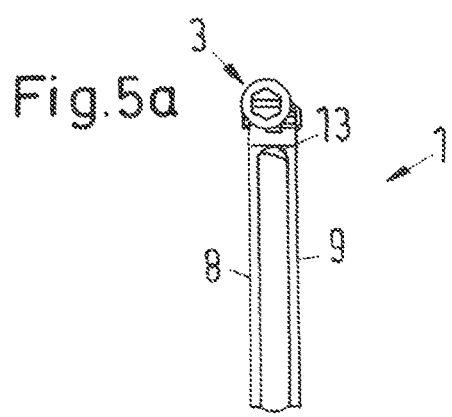
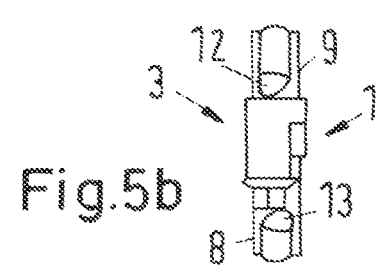

HOSE CLIP

CROSS-REFERENCE TO RELATED APPLICATION

This application claims the benefit of German Patent Application No. 10 2017 107 727.8, filed Apr. 10, 2017, the entire contents of which are hereby incorporated by reference.

TECHNICAL FIELD

The present disclosure relates to a hose clip.

BACKGROUND

A plurality of hose clips with a wide variety of possible uses is available commercially. A particularly common field of use in this case is the fastening of fluid lines to pipe connectors, for example in motor vehicles.

Due to numerous factors—namely higher system pressures, higher temperatures and longer periods of use—the requirements are continually increasing for the connections of fluid lines. In this case, in particular, a high retaining force and effective sealing properties are desired.

The hose clips of the prior art typically have a smooth clip band, with the ends of the clip band are connected together via a clamping device. By means of the clamping device, a diameter of the hose clip may be reduced. As a result, radial clamping forces and/or compressive forces are exerted, for example, onto a hose end pushed over a connector and thus the hose end is secured to the connector.

The forces acting due to the clamping forces on the hose end, however, may extend in a non-uniform manner over the circumference of the hose end or another object to be clamped. In such a case, generally the greatest pressure is generated directly below the clamping device, whereby at times considerably less pressure may be produced around the remaining circumference of the clip.

A uniform distribution of force is often desired for producing an effective seal over the entire circumference of the object to be clamped, for example a pipe or a fluid line. Otherwise, in specific regions of the clip in which lower forces are introduced, such as for example on a side of the clip band opposing the clamping device, this may result in a reduced seal or leakages. Moreover, a non-uniform clamping force may contribute to the overloading of the object being clamped, which may lead to the formation of fissures or cracks and considerably reduce the service life of the connection.

It is an object of an embodiment of the present disclosure, therefore, to provide a hose clip which eliminates the drawbacks of the prior art and which produces a high clamping force in the case of a small constructional space requirement, with a uniform distribution of force over a long time period.

This object is achieved by at least one embodiment of a hose clip detailed herein.

SUMMARY

In a hose clip comprising a clip band and a clamping device, according to one embodiment, it is provided that a receiving region is configured between axial edge regions of the clip band, said receiving region extending radially outwardly and in the circumferential direction, wherein the receiving region is interrupted in the region of the clamping device.

By the receiving region which extends on an inner face of the clip band in a concave manner between the axial edge regions, a contact surface is reduced between the clip band and a circumferential surface of a hose end or the like on the edge regions and/or the region below the clamping device. As a result, in the edge regions a greater pressure is exerted on the hose end, whilst at the same time the material of the hose end may be diverted into the receiving region. Thus, in a manner of speaking, a spring elastic pre-tensioning is introduced into the material, which is able to compensate for fluctuations in the clamping force, for example due to ageing or temperature differences. As a result, additional resilient components, such as for example spring elements fastened to the clip, may be dispensed with. Moreover, a uniform distribution of the forces exerted by the hose clips is achieved by a larger contact surface being provided in the region of the clamping device and thus the forces are transmitted over a larger surface area. Thus, as a whole, greater clamping forces may be introduced since the pressure in the region of the clamping device is at least not substantially greater than in the other regions of the clip.

Preferably, the clip band has a smooth inner face in the region of the clamping device. In other words, a receiving region is not formed in the clip band below the clamping device. This permits a particularly uniform introduction of the clamping force in this region and prevents pressure peaks from occurring.

In an embodiment, the receiving region is formed by a cross section of the clip band, said receiving region being configured to be partially elliptical, part-circular or trapezoidal. Thus, a concave and/or radially outwardly bulged shape is achieved. Material displaced by the clamping of the hose clip is thus able to be received in a simple manner in the receiving region.

In particular, a cross section may be selected such that a depth of the receiving region is the greatest in its center. In this case, the center is defined as the central point of the receiving region in the axial direction of the hose clip. As a result, a substantially symmetrical action of force is produced between the edge regions.

In an embodiment, the clamping device includes a clamping screw. The clip in this case is configured, in particular, as a worm drive clip in which the clamping screw cooperates with a thread on the outer face of the clip band. With such a clip, high clamping forces may be produced in a relatively simple manner. Alternatively, clamping heads could also be configured at the ends of the clip band, said clamping heads being able to be tensioned relative to one another via the clamping screw.

In another embodiment, the clamping device may have a quick-release connector or the like, instead of a clamping screw.

In an embodiment, a longitudinal axis of the clamping screw is arranged axially eccentrically. When clamping a clip comprising a worm drive, an eccentric loading of the clamping band results from a thread pitch of the clamping screw. Additionally, a torque is transmitted to the clamping band. By the eccentric arrangement of the clamping screw this effect is counteracted, so that the maximum clamping force is again introduced in a center of the clip band and not offset in the direction of one of the edge regions. This leads to a more uniform distribution of the clamping force in the axial direction of the hose clip and thus to a greater operating reliability.

In an embodiment, the receiving region comprises a first end region and a second end region, wherein the clamping device is arranged between the first end region and the second end region. In this case, the receiving region may be interrupted in a simple manner and gradually transition into the receiving region below the clamping device. The occurrence of stress peaks inside the clip band is thus precluded.

In this case, it may be preferred in an embodiment if the first end region tapers towards a first end and the second end region tapers towards a second end, wherein the first end and the second end are arranged axially, in particular eccentrically. By way of the tapering, a gradual transition into the flat region below the clamping device is achieved. Thus, a more uniform distribution of pressure around the clip circumference may be ensured.

With an axial eccentric tapering of the ends, it is possible to influence the compressive force exerted by the clip band onto a hose end or the like, even in the axial direction of the hose clip. In principle, in this case a greater pressure is exerted in the edge region from where the end has a smaller spacing.

In an embodiment, the first end and the second end are arranged on the same side of a central line of the clip band circulating in the circumferential direction. Thus, a greater pressure is exerted onto the hose end via the edge region located closer to the ends than via the other edge region. Thus, a pressure may be maximized on one side.

By means of this embodiment, for example, the asymmetrical introduction of the force of the clamping screw may be compensated or increased, depending on the side of the clamping screw into which the ends of the end regions run.

In an alternative embodiment, the first end and the second end are arranged on opposing sides of the circumferential central line of the clip band. In this case, a compromise may be called for between maximum strength and effective distribution of pressure.

The first end and the second end may be configured, in particular, to be partially round and/or circular or running to a point.

In an embodiment, the receiving region is configured uniformly in the circumferential direction between the end regions. Such a planar receiving region may be easily produced and leads to a uniform exertion of the clamping force.

BRIEF DESCRIPTION OF THE DRAWINGS

One or more aspects of the disclosure will hereinafter be described in conjunction with the appended drawings, wherein like designations denote like elements, and wherein:

FIG. 3a shows a side view of a first embodiment of the hose clip;

FIG. 3b shows a plan view of the hose clip according to FIG. 3a;

FIG. 4a shows a side view of a second embodiment of the hose clip;

FIG. 4b shows a plan view of the hose clip according to FIG. 4a;

FIG. 5a shows a side view of a further embodiment of the hose clip; and

FIG. 5b shows a plan view of the hose clip according to FIG. 5a.

DETAILED DESCRIPTION

Figure 1:
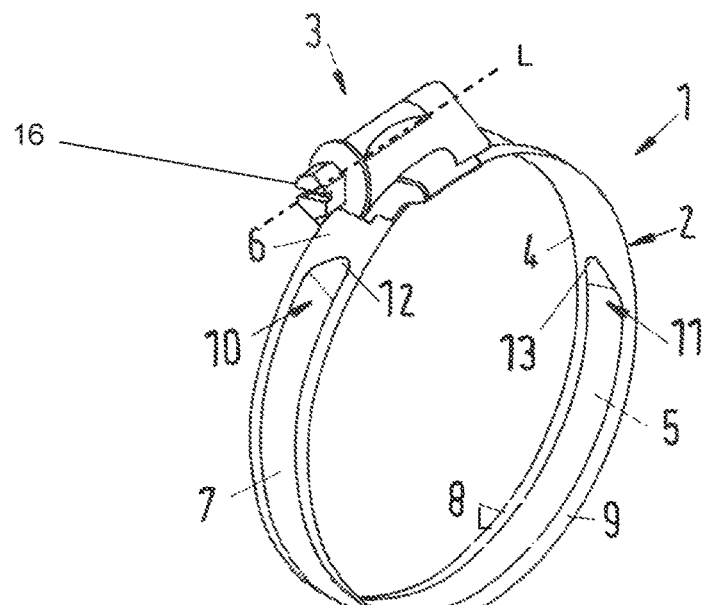
FIG. 1 shows a hose clip in a perspective view.

The hose clip 1 shown in FIG. 1 is configured as a worm drive clip and includes a clip band 2 and a clamping device 3. A concave receiving region 5, extending in the circumferential direction, is configured on an inner face 4 of the clip band 2, the receiving region 5 being mirrored in a corresponding convex bulged portion 7 on an outer face 6 of the clip band 2. Below the clamping device 3, the receiving region 5 is interrupted and the inner face 4 of the clip band 2 is configured to be smooth at that point.

Axial edge regions 8, 9 are configured on the edge of the clip band 2, the axial edge regions 8, 9 axially defining the receiving region 5 and substantially serving for transmitting force to a hose end or the like.

The receiving region 5 has a first end region 10 and a second end region 11, the clamping device 3 being arranged between the end regions 10, 11. The first end region 10 tapers towards a first end 12 and the second end region 11 tapers towards a second end 13. In this case, the ends 12, 13 are not located on an axial central line of the clip band 2 but are axially offset in the direction of one of the edge regions 8, 9. In this exemplary embodiment, the ends 12, 13 are located on different sides of the central line, namely the end 12 is closer to the edge region 9 and the end 13 is closer to the edge region 8.

Figure 2:
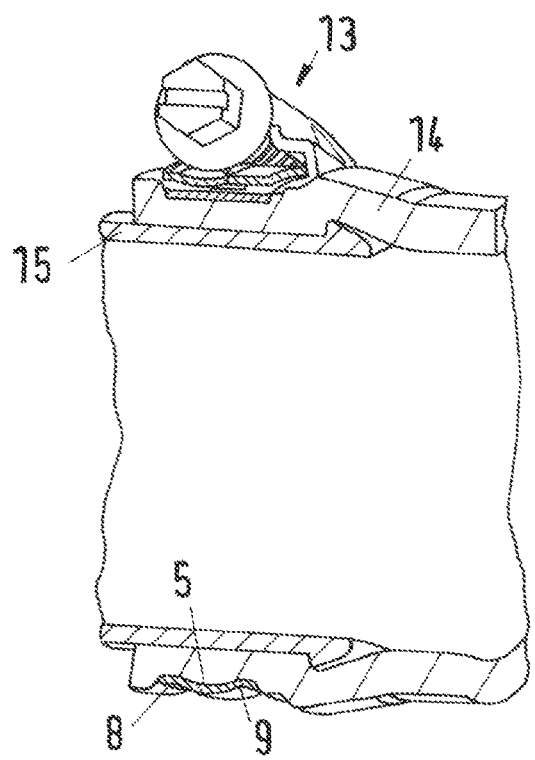
FIG. 2 shows a cross section of the hose clip mounted on a hose end.

In FIG. 2, a sectional view is shown through a hose clip 1 mounted on a hose end 14, whereby the hose end 14 is pushed onto a pipe connector 15. The hose clip in this case is already clamped and thus exerts radially inwardly oriented forces onto the hose end 14, so that the hose end is held sealingly and securely on the pipe connector 15.

The clip band 2 of the clip 1 bears substantially with the edge regions 8, 9 against the outer circumference of the hose end 14. When clamping the hose clip 1, therefore, a relatively high pressure is exerted in the edge regions 8, 9 on the hose end 14, wherein a resilient material of the hose end 14 is forced thereby into the receiving region 5. As a result, a spring action is produced which, for example, is able to compensate for alterations to the clamping force occurring due to temperature fluctuations. Thus, a permanent seal and a secure retention of the hose end 14 on a connector 15 is achieved.

FIGS. 3a and 3b show an embodiment of the hose clip 1, where the clamping device 3 has a clamping screw 16. A longitudinal axis L of the clamping screw 16 in this case is arranged axially eccentrically. This hose clip, therefore, is a worm drive clip with an eccentric clamping screw.

The first end region 10 tapers in this case to a first end 12 and the second end region 11 tapers to a second end 13, where the first end 12 and the second end 13 are arranged axially eccentrically and on the same side of a central axis (m) of the clip band 2 circulating in the circumferential direction. In this case, the ends 12, 13 and the longitudinal axis L of the clamping screw 16 are located on the same side of the central line, thus both are closer to the same edge region 8 than to the other edge region 9. As a result, below the edge region 8 a particularly high pressure is able to be introduced into the hose end. Thus, a high sealing action is achieved thereby.

FIGS. 4a and 4b show an alternative embodiment of the hose clip 1, where the first end 12 and the second end 13 are located closer to the one edge region 9 and the longitudinal axis L of the clamping screw 16 is located closer to the other edge region 8. The ends 12, 13 are hence located on a different side of the central line (m) than the longitudinal axis L of the clamping screw 16. In this embodiment, a similar pressure level is produced in both sides. Thus, a high retaining force is produced thereby.

In the embodiment shown in FIGS. 5a and 5b, the first end 12 is located closer to the edge region 8 and the end 13 is located closer to the edge region 9. The ends 12, 13 are thus located on different sides of the central line (m). This embodiment, in a sense, represents a good compromise between retaining forces and sealing action.

The disclosed hose clip is not limited to one of the embodiments described above, and rather is able to be modified in many different ways.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A hose clip comprising a clip band and a clamping device, wherein a receiving region is configured between axial edge regions of the clip band, said receiving region extending radially outwardly and in a circumferential direction, wherein the receiving region is interrupted in the region of the clamping device, wherein the receiving region comprises a first end region and a second end region, wherein the clamping device is arranged between the first end region and the second end region, wherein the first end region tapers towards a first end and the second end region tapers towards a second end, wherein the first end and the second end are eccentrically arranged in an axial direction of the hose clip.

2. The hose clip according to claim 1, wherein a cross-section of the receiving region being configured to be partially elliptical or circular.

3. The hose clip according to claim 1, wherein the clamping device comprises a clamping screw, wherein a longitudinal axis (L) of the clamping screw is arranged axially eccentrically.

4. The hose clip according to claim 3, wherein the receiving region is configured uniformly in the circumferential direction between the end regions.

5. The hose clip according to claim 1, wherein the first end and the second end are arranged on the same side of a central axis (m) of the clip band circulating in the circumferential direction.

6. The hose clip according to claim 5, wherein the receiving region is configured uniformly in the circumferential direction between the end regions.

7. The hose clip according to claim 1, wherein the first end and the second end are arranged on opposing sides of the circumferential central axis (m) of the clip band.

8. The hose clip according to claim 7, wherein the receiving region is configured uniformly in the circumferential direction between the end regions.

9. The hose clip according to claim 1, wherein the receiving region is configured uniformly in the circumferential direction between the end regions.

* * * * *